AUGMENTED SAFE VOLTAGE SWING AMPLIFIER

Filed June 13, 1962

INVENTOR.
GEORGE B. COTTRELL
BY Edward A. Sokolski
ATTORNEY

United States Patent Office
3,249,885
Patented May 3, 1966

3,249,885
AUGMENTED SAFE VOLTAGE SWING AMPLIFIER

George B. Cottrell, Norwalk, Calif., assignor to North American Aviation, Inc.
Filed June 13, 1962, Ser. No. 202,245
2 Claims. (Cl. 330—20)

This invention relates to an augmented safe voltage swing amplifier and more particularly to such an amplifier having increased output capabilities for components of a given rating.

Prior art discloses that use of an inductive load in the output circuit of an amplifier, such as a vacuum tube or transistor, can cause the plate to collect voltage to be larger than the supply voltage. When the plate or collector voltage decreases below an average value, collapsing flux in the output transformer induces voltage in the transformer primary in such a direction as to add to the supply voltage. The induced voltage, in many cases, equals the supply voltage such that the combined voltage placed across the transistor or vacuum tube amplifier exceeds the ratings thereof, sometimes resulting in damage to this component.

Applicant's amplifier takes advantage of the voltage swing capabilities inherent in transformer coupling without exceeding component ratings. Applicant's circuit permits the output voltage to be double the collector-emitter or plate to cathode rating of a single transistor or vacuum tube. Applicant's circuit also is more efficient in that the amplifier is made to operate in Class B conditions as contrasted with Class A or Class AB operation in similar prior art circuits.

Applicant's circuit achieves the desired results by utilizing a switch in a series configuration comprising an input signal source, an amplifier, and an output transformer. The switch is connected so that it is cut on by one half cycle of the input signal. During this half cycle, an amplified signal appears at the output winding of the transformer. During the other half cycle, the switch is held open and prevents the induced voltage across the output transformer as added to the supply voltage from appearing across the amplifier and thereby prevents the voltage rating of the amplifier from being exceeded. A circuit for full wave output can be derived by connecting two similar half wave stages in push pull configuration.

It is therefore an object of this invention to provide an improved amplifier circuit using transformer coupling in which full advantage is taken of component ratings.

It is a further object of this invention to provide an improved circuit which takes full advantage of the swing capabilities inherent in transformer coupling.

It is still a further object of this invention to provide an improved amplifier capable of higher output for a given amplifier stage voltage rating.

Figure 1:
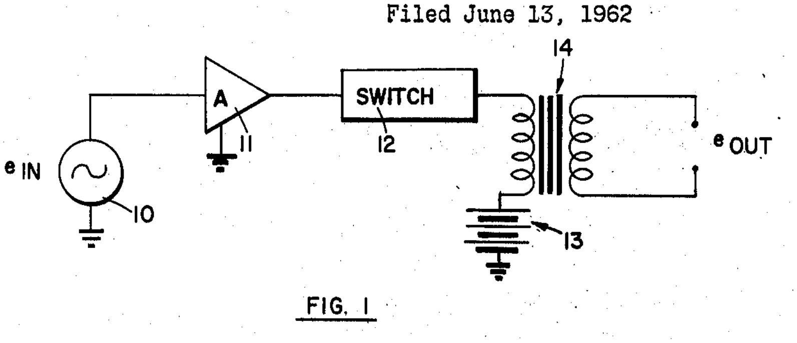
Figure 3:
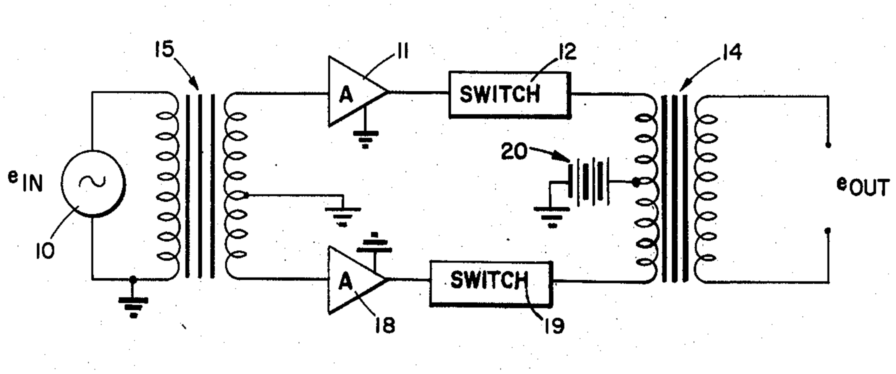
Figure 2:
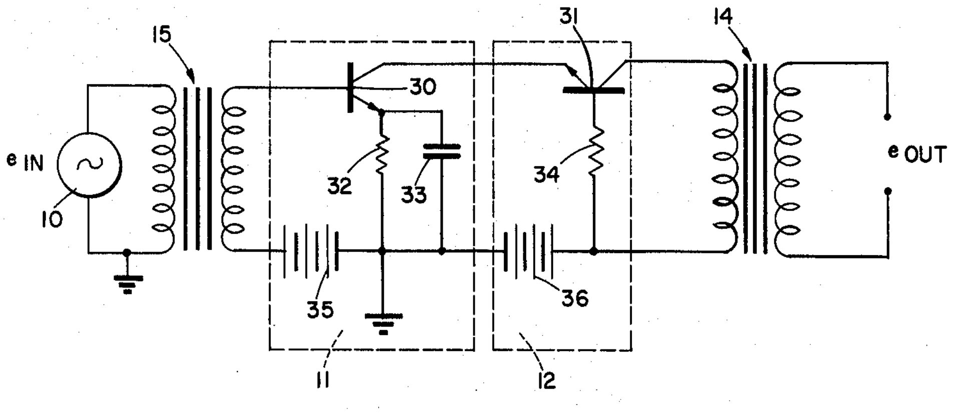

Other objects, features, and advantages of the present invention will become apparent from the following description taken in connection with the accompanying drawings, of which FIG. 1 is a block diagram illustrating the device of the invention;

FIG. 2 is a schematic diagram of a preferred embodiment of the device of the invention; and FIG. 3 is a block diagram of a full wave version of the device of the invention.

Referring now to FIG. 1, an A.C. output signal from input signal source 10 is amplified by amplifier 11 and passes to switch 12. During the first half cycle of the input signal, the switch 12 is held closed by means to be described in connection with FIG. 2. An amplified signal appears during this half cycle at the output of transformer 14. During the next half cycle of the input signal, the voltage across the transformer starts to decrease.

The collapsing flux causes a voltage build up across the transformer primary winding which adds to the supply voltage from source 13. The switch is connected so that during this half cycle the voltage caused by the collapsing flux holds it open. Because the switch is an open circuit, the voltage across the primary winding of the transformer due to the collapsing flux field as added to the supply voltage from source 13 is prevented from appearing across the amplifier 11. Therefore, in this manner, the maximum voltage appearing across the amplifier 11 is limited and the amplifier is thereby enabled to operate at high output capacity without exceeding the voltage ratings of the amplifier components.

Referring now to FIG. 2, a specific embodiment of applicant's invention for half cycle operation is illustrated. The transistors used as well as the biasing arrangement or the particular connection for the supply voltages could obviously be changed or modified to suit a particular application by design techniques well known in the art. As previously indicated, the circuit could also be modified by using center tapped transformers on both the inputs and outputs to achieve full wave push pull operation. However, as was indicated in connection with FIG. 1 and as will be indicated in connection with FIG. 3, in such instance, the opposite section of the circuit would be performing an identical function during different periods and therefore need not be discussed separately.

For the circuit illustrated in FIG. 2, with no input signal, the total collector current flowing through transistors 30 and 31 depends on resistor 34 which supplies base current to 31 and hence controls collector current for transistors 30 and 31. Transistor 31 is appropriately biased by the biasing battery 36. Collector current for transistor 30 flows through transistor 31 and the primary of transformer 14. As the input signal from input signal source 10 causes the base current of transistor 30 to increase, the emitter of transistor 31 swings with the collector of transistor 30 towards ground potential. Transistor 31 is thus driven into saturation thereby providing a low impedance current path between the collector of transistor 30 and the primary of transformer 14 during a positive excursion of transistor 30 base current. As transistor 30 base current decreases below its average value the collapsing flux of transformer 14 causes a voltage reversal across its primary. Transistor 30 collector swings towards the collector voltage of transistor 31 but as it reaches the collector supply voltage from source 36, the base-emitter voltage of transistor 31 becomes zero, since the base is tied to the collector supply voltage and the induced voltage in the primary of transformer 14 back biases the collector-base junction of transistor 31. Transistor 31, therefore, becomes an open circuit from emitter to collector disconnecting the power source 36 and the voltage across the primary of transformer 14 from transistor 30. Transistor 30, having its collector disconnected from any source of power is also cut off. Transistor 30 collector voltage thus is prevented from rising above the collector supply voltage from source 36. The voltage swing across the transformer primary may be safely increased to the sum of the two transistor voltage ratings.

Applicant's circuit may be connected for push pull operation as illustrated in FIG. 3 so that when one half of the circuit is in a cut off cycle, the other half will be cut on. The circuit operation for each half section of the push pull version of FIG. 3 is identical to that disclosed in FIG. 1.

During one half cycle of the input signal from source 10, amplifier 11 and switch 12 are operable and one half wave of the amplified signal appears at the output of transformer 14. During the next half cycle of the input signal from source 10 amplifier 11 and switch 12 are switched off and amplifier 18 and switch 19 are operable as described in connection with FIG. 2. During this half cycle the other half of the amplified input signal appears across transformer 14, thus achieving push pull operation by use of identical stages.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An augmented safe voltage swing amplifier comprising:
- a first transistor having base, emitter and collector electrodes;
- means for applying an input signal to the base of said first transistor;
- a reference terminal;
- a first resistor connected between the emitter of said first transistor and said reference terminal;
- a bypass capacitor connected in parallel with said first resistor;
- a first source of potential for supplying a biasing potential to said first transistor;
- a second transistor of the same conductivity type as said first transistor and having base, emitter and collector electrodes;
- an electrical path interconnecting the collector of said first transistor and the emitter of said second transistor;
- an output transformer having a primary and secondary winding;
- an electrical path interconnecting the collector of said second transistor and a first terminal of said primary winding;
- an output circuit connected to said secondary winding;
- a second source of potential for supplying a biasing potential for said second transistor, connected between a second terminal of said primary winding and said reference terminal;
- a second resistor connected between the base of said second transistor and said second terminal, said second resistor having a value which causes said second transistor to cut-off when the potential on the collector of said second transistor increases in magitude above the potential of said second source of potential.

2. An augmented safe voltage swing amplifier having two signal paths arranged in push-pull relationship, each of said paths comprising:
- a first transistor having base, emitter and collector electrodes;
- means for applying an input signal in push-pull relationship to the bases of the first transistors of said signal paths;
- a reference terminal;
- a first resistor connected between the emitter of said first transistor and said reference terminal;
- a bypass capacitor connected in parallel with said first resistor;
- a first source of potential for supplying a biasing potential to said first transistor, connected between said reference terminal and the base of said first transistor;
- a second transistor of the same conductivity type as said first transistor and having base, emitter and collector electrodes;
- an electrical path interconnecting the collector of said first transistor and the emitter of said second transistor;
- an output transformer having a center tapped primary and a secondary winding;
- an electrical path interconnecting the collector of said second transistor and a first terminal of said primary winding;
- an output circuit connected to said secondary winding;
- a second source of potential for supplying a biasing potential for said second transistor, connected between said center tap and said reference terminal;
- a second resistor connected between the base of said second resistor and said second terminal, said second resistor having a value which causes said second transistor to cut-off, when the potential on the collector of said second transistor increases in magnitude above the potential of said second source of potential.

References Cited by the Examiner

UNITED STATES PATENTS

| | | | |
|---|---|---|---|
| 3,069,569 | 12/1962 | Singer et al. | 307—88.5 |
| 3,078,375 | 2/1963 | Hedges et al. | 307—88.5 |
| 3,095,508 | 6/1963 | Karsh | 307—88.5 |

FOREIGN PATENTS

| | | |
|---|---|---|
| 1,083,335 | 6/1960 | Germany. |
| 817,094 | 7/1959 | Great Britain. |

ROY LAKE, *Primary Examiner.*

NATHAN KAUPMAN, *Examiner.*